(12) United States Patent
Antypas, III et al.

(10) Patent No.: US 9,003,055 B2
(45) Date of Patent: Apr. 7, 2015

(54) CONTROLLING THIRD PARTY ACCESS TO NETWORK DEVICES

(75) Inventors: John Antypas, III, Pittsburg, CA (US); Howard G. Hammer, Wayne, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 360 days.

(21) Appl. No.: 13/550,238

(22) Filed: Jul. 16, 2012

(65) Prior Publication Data

US 2014/0020080 A1    Jan. 16, 2014

(51) Int. Cl.
*G06F 15/16* (2006.01)
*G06F 21/00* (2013.01)

(52) U.S. Cl.
CPC ...................................... *G06F 21/00* (2013.01)

(58) Field of Classification Search
CPC ....... H04L 47/215; H04L 47/10; H04L 63/08; G06F 21/00

USPC ............ 370/230, 235; 455/435.1; 705/14.16; 726/26, 3, 9; 709/232
See application file for complete search history.

(56) References Cited

U.S. PATENT DOCUMENTS

| | | | |
|---|---|---|---|
| 2007/0206501 A1* | 9/2007 | Alesi et al. .................... 370/235 |
| 2009/0286540 A1* | 11/2009 | Huber et al. ................ 455/435.1 |
| 2011/0191822 A1* | 8/2011 | Pinsky et al. ...................... 726/3 |
| 2012/0044805 A1* | 2/2012 | Lee et al. ....................... 370/230 |
| 2012/0192285 A1* | 7/2012 | Heyman et al. ................. 726/26 |
| 2012/0323654 A1* | 12/2012 | Writer ........................ 705/14.16 |
| 2014/0020080 A1* | 1/2014 | Antypas et al. .................... 726/9 |

\* cited by examiner

*Primary Examiner* — Jungwon Chang

(57) ABSTRACT

A device may receive a command from a source device, may receive information that identifies a destination device associated with the command, may receive information that identifies a user associated with the source device, and may determine a network condition of a network associated with the destination device. The device may determine that the user is associated with an available token, where the available token is associated with the user, the command, and the network condition. The device may transmit, to the destination device and based on determining that the user is associated with the available token, the command.

20 Claims, 13 Drawing Sheets

| Listener Device Identifier 610 | Address 620 | Network Type 630 | Geographic Location 640 |
|---|---|---|---|
| 555-123-4567 | 2001:0db8:85a3:0000: 0000:8a2e:0370:7334 | LTE | Washington, DC |
| LD-2 | 172.16.254.1 | IMS | Lat: 38.89 Long: -77.03 |
| 49-015420-323751 | 444-717-6767 | GSM | London, UK |

FIG. 6

| User 705 | Command 710 | Network Condition 715 | Maximum Tokens per Cycle 720 | Available Tokens this Cycle 725 | Total Available Tokens 730 | Access Interval 735 |
|---|---|---|---|---|---|---|
| ABC Corp | WakeUp | Offpeak LTE | 30 / day | 10 | 25 | 30 min |
| ABC Corp | WakeUp | Any Other (Non-Offpeak & Non-LTE) | Unlimited | 5 | 5 | none |
| ABC Corp | GetLocation | LTE | 20 / hour | 20 | 40 | 5 min |
| XYZ Inc | All | Offpeak | 20 / day | 15 | 100 | 1 hour |
| XYZ Inc | All | Any Other (Non-Offpeak) | 0 | 0 | 0 | none |

CONTROLLING THIRD PARTY ACCESS TO NETWORK DEVICES

BACKGROUND

Machine-to-machine communications involve communication between devices, without human interaction. Devices may communicate with one another using addresses, such as an Internet protocol ("IP") address. Device communication using addresses may require that each device know the address of the other device.

BRIEF DESCRIPTION OF THE DRAWINGS

FIG. 6 is a diagram of an example data structure that stores listener device information;

FIG. 7 is a diagram of an example data structure that stores access management information;

DETAILED DESCRIPTION OF PREFERRED EMBODIMENTS

The following detailed description of example embodiments refers to the accompanying drawings. The same reference numbers in different drawings may identify the same or similar elements.

A user of a network may want to learn information associated with devices on the network. The user may use device-to-device communication to learn the information. For example, a controller device or a source device (e.g., a third party server) may be used to request information (e.g., a geographic location) from a listener device or a destination device (e.g., a mobile device associated with the third party) by sending a command (e.g., a remote procedure call) to the listener device. The listener device may respond to the command by sending the requested information to the controller device.

Communications between the controller device and the listener device may cause network disruptions (e.g., over-utilization of network bandwidth). Implementations described herein may prevent network disruptions by limiting communications between the controller device and the listener device.

Figure 1:
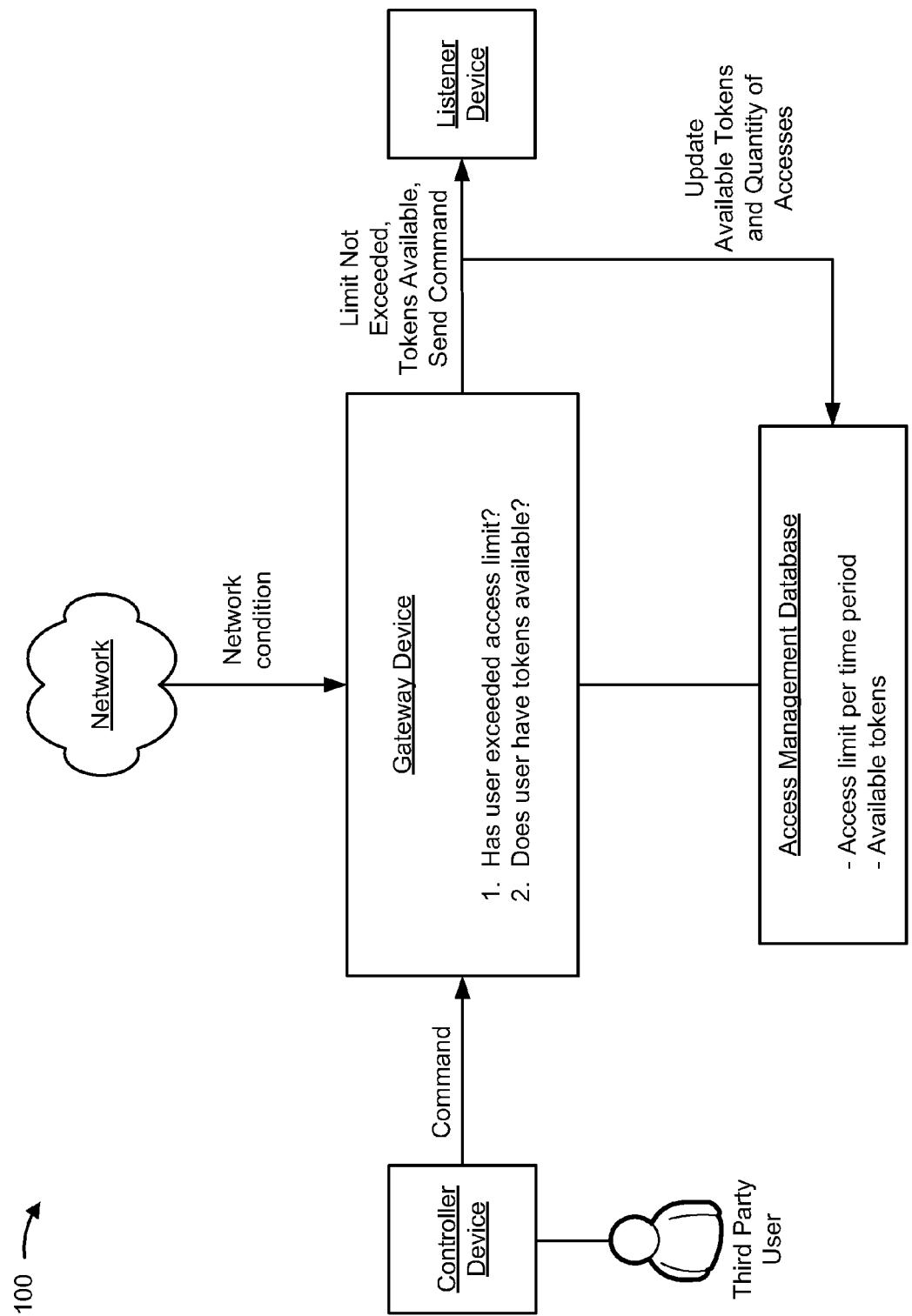
FIG. 1 is a diagram of an overview of an example implementation described herein.

FIG. 1 is a diagram of an overview 100 of an example implementation described herein. As illustrated in FIG. 1, the example implementation may include a controller device, a listener device, a gateway device, an access management database, and a network. The controller device may be a third party server that gathers and processes information received from listener devices. The listener device may be a mobile device associated with the third party. The gateway device may receive a network condition (e.g., whether the network is operating during peak hours or offpeak hours), and may control third party access to the listener device based on the network conditions. The gateway device may utilize the access management database to control third party access to the listener device.

For example, the gateway device may receive a command from a controller device associated with a third party user. The command may include a request for information from the listener device, such as a geographic location of the listener device. The gateway device may utilize the access management database to determine whether the user has exceeded an access limit for sending the command to the listener device under a current network condition (e.g., during peak hours).

The gateway device may also utilize the access management database to determine whether the user has permission to send the command to the listener device under the current network condition. For example, the user may be assigned one or more tokens that give permission for the user to send the command to the listener device under certain network conditions. The user may only be permitted to send a particular command to the listener device a particular quantity of times based on the network condition, and only when the user has tokens available to send the command under the network condition.

If the user has not exceeded the access limit, and the user has tokens available, the gateway device may provide the command (or permit the controller device to provide the command) to the listener device. The access management database may be updated with a new quantity of available tokens and/or a new quantity of accesses (e.g., a quantity of accesses that count against the access limit). For example, the quantity of available tokens may be decremented, and the quantity of accesses may be incremented. If the user has exceeded the access limit, or the user does not have tokens available, the gateway device may not provide the command (or may not permit the controller device to provide the command) to the listener device.

Figure 2:
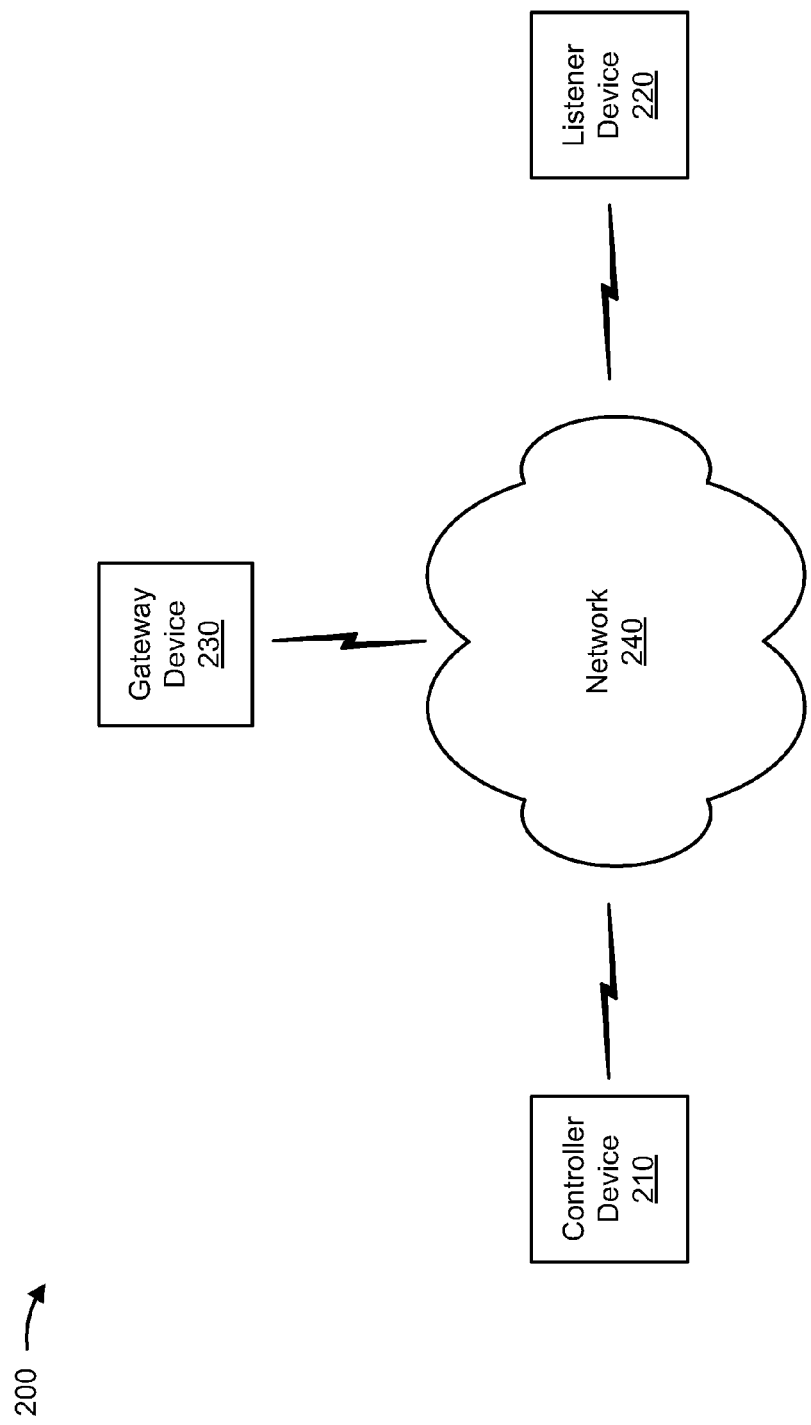
FIG. 2 is a diagram of an example environment in which systems and/or methods described herein may be implemented.

FIG. 2 is a diagram of an example environment 200 in which systems and/or methods described herein may be implemented. Environment 200 may include a controller device 210, a listener device 220, a gateway device 230, and a network 240.

The number of devices and/or networks illustrated in FIG. 2 is provided for explanatory purposes. In practice, there may be additional devices and/or networks, fewer devices and/or networks, different devices and/or networks, or differently arranged devices and/or networks than are shown in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Controller device 210 may include a computation and communication device that is capable of communicating with listener device 220, gateway device 230, and/or a network (e.g., network 240). For example, controller device 210 may include a computer (e.g., a server, a personal computer, a desktop computer, a laptop computer, a tablet computer, etc.), a radiotelephone, a personal communications system terminal (e.g., that may combine a cellular radiotelephone with data processing and data communications capabilities), a personal digital assistant (e.g., that can include a radiotelephone, a pager, Internet/intranet access, etc.), a smart phone, and/or another type of computation and communication device. In some implementations, controller device 210 may include a third party server trying to access listener device 220 by sending a command (e.g., a request for information, a remote procedure call, etc.) to listener device 220 via gateway 230.

Listener device 220 may include a computation and communication device that is capable of communicating with controller device 210, gateway device 230, and/or a network (e.g., network 240). For example, listener device 220 may include a radiotelephone, a personal communications system terminal (e.g., that may combine a cellular radiotelephone with data processing and data communications capabilities), a personal digital assistant (e.g., that can include a radiotelephone, a pager, Internet/intranet access, etc.), a smart phone, a computer (e.g., a server, a personal computer, a desktop computer, a laptop computer, a tablet computer, etc.), a camera, a personal gaming system, a set-top box, and/or another type of computation and communication device. In some implementations, listener device 220 may include a mobile device, associated with a third party, that may receive a command from controller device 210 via gateway 230, and may perform an operation based on the command (e.g., may send information to controller device 210, may launch an application, etc.).

Gateway device 230 may include a computation and communication device that is capable of communicating with controller device 210, listener device 220, and/or a network (e.g., network 240). For example, gateway device 230 may include a computer (e.g., a server, a personal computer, a desktop computer, a laptop computer, a tablet computer, etc.) and/or another type of computation and communication device. Additionally, or alternatively, gateway device 230 may include one or more traffic processing and/or traffic transfer devices, such as a gateway, a router, a modem, a switch, a firewall, a network interface card, a hub, a bridge, a proxy server, an optical add-drop multiplexer, a mobile hotspot device, a tethering device, or another type of device that processes and/or transfers traffic. In some implementations, gateway device 230 may control and/or facilitate communication between controller device 210 and listener device 220.

In some implementations, controller device 210 may not be able to directly access listener device 220 without knowing an address associated with listener device 220. For example, listener device 220 may be associated with a dynamic address (e.g., an Internet protocol version 6 ("IPv6") address). Gateway device 230 may monitor listener device 220 and an address (e.g., an IPv6 address) associated with listener device 220. Gateway device 230 may assist controller device 210 in accessing listener device 220. Additionally, or alternatively, gateway device 230 may control access to listener device 220.

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 240 may include a local area network ("LAN"), a wide area network ("WAN"), a metropolitan area network ("MAN"), a telephone network (e.g., the Public Switched Telephone Network ("PSTN")), an ad hoc network, an intranet, a fiber optic-based network (e.g., "FiOS"), and/or a combination of these or other types of networks.

Figure 3:
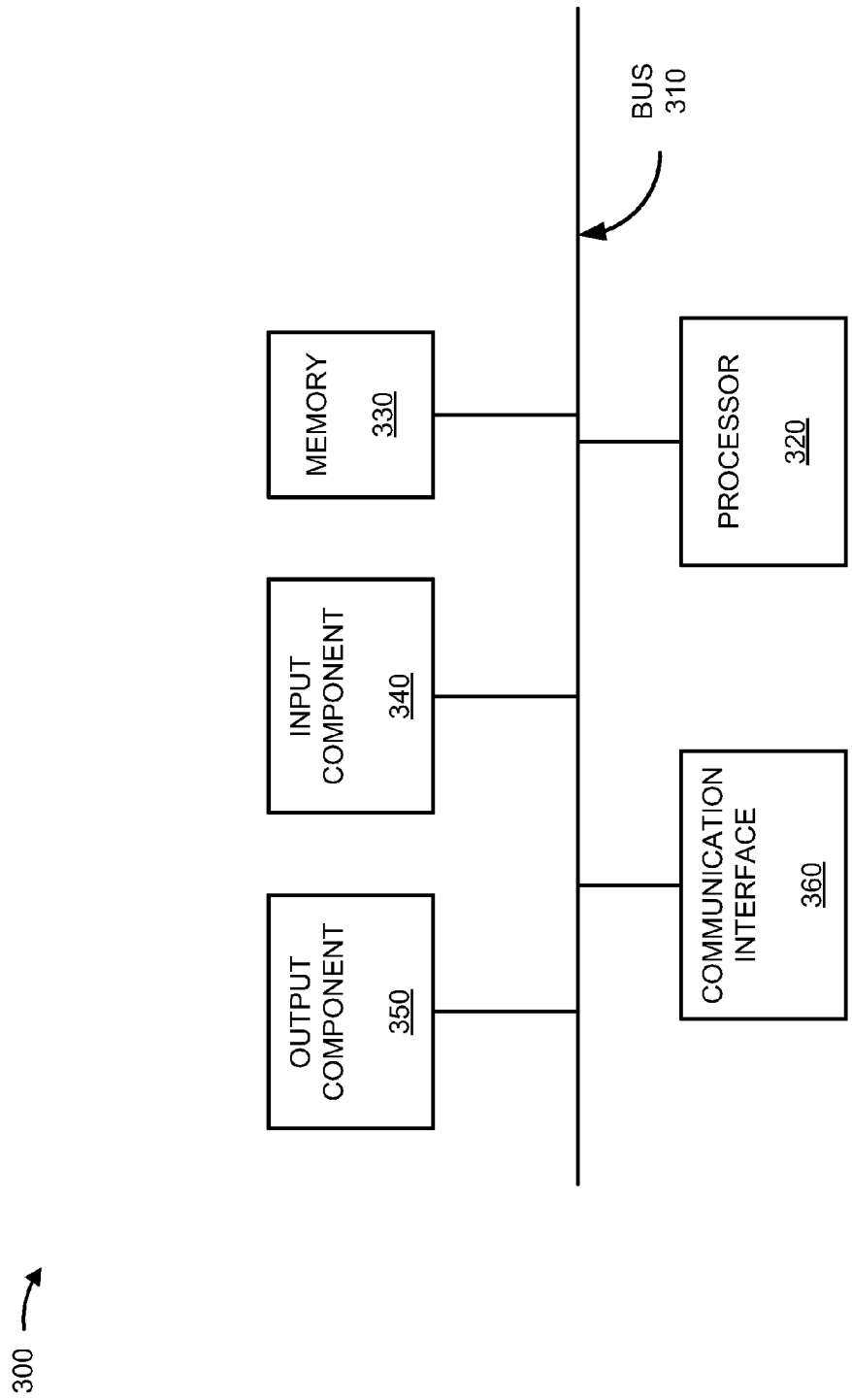
FIG. 3 is a diagram of example components of one or more devices of FIG. 2.

FIG. 3 is a diagram of example components of a device 300. Device 300 may correspond to controller device 210, listener device 220, and/or gateway device 230. Additionally, or alternatively, each of controller device 210, listener device 220, and/or gateway device 230 may include one or more devices 300 and/or one or more components of device 300.

Device 300 may include a bus 310, a processor 320, a memory 330, an input component 340, an output component 350, and a communication interface 360. In some implementations, device 300 may include additional components, fewer components, different components, or differently arranged components than those illustrated in FIG. 3.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and executes instructions. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include mechanisms for communicating with another device and/or system via a network, such as network 240. Additionally, or alternatively, communication interface 360 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

Figure 4:
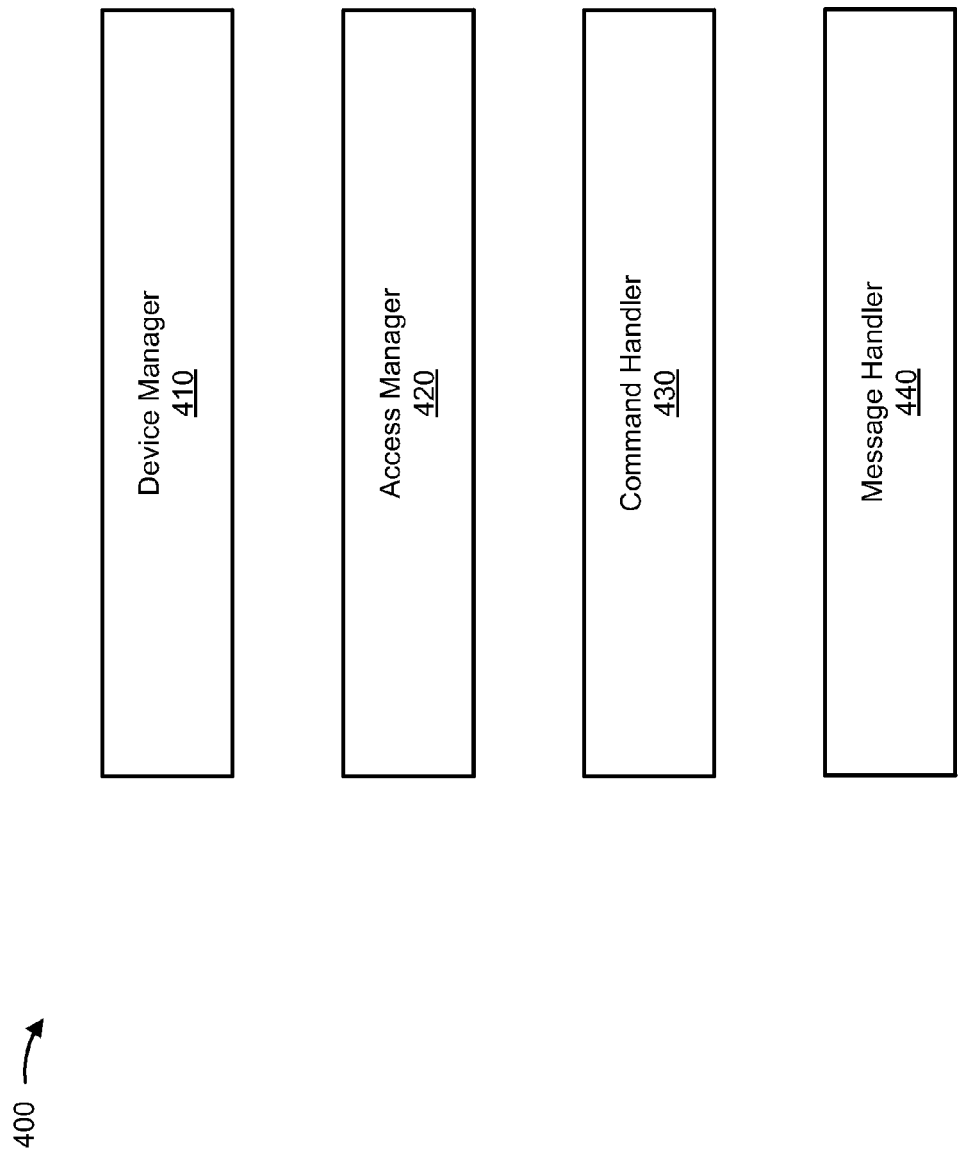
FIG. 4 is a diagram of example functional components of one or more devices of FIG. 2.

FIG. 4 is a diagram of example functional components of a device 400 that may correspond to gateway device 230. Device 400 may include a device manager 410, an access manager 420, a command handler 430, and a message handler 440. Each of functional components 410-440 may be implemented using one or more devices 300 or one or more components of device 300. Gateway device 230 may individually include all of the functional components depicted in FIG. 4, or the functional components depicted in FIG. 4 may be distributed singularly or duplicatively in any manner between the devices illustrated in FIG. 2. In some implementations, gateway device 230 may include other functional components (not shown) that aid in controlling and/or facilitating communication between controller device 210 and listener device 220.

Device manager 410 may perform operations associated with managing listener device information. In some implementations, device manager 410 may keep track of and/or monitor listener devices 220 that are connected to network 240. Additionally, or alternatively, device manager 410 may store information associated with listener device 220 connected to network 240. For example, device manager 410 may receive and/or store an address (e.g., an IPv6 address, an Internet protocol version 4 ("IPv4") address, a dynamic address, an Internet protocol multimedia subsystem ("IMS") address, etc.) associated with listener device 220, a type of network (e.g., an LTE network, an enhanced high rate packet data ("eHRPD") network, a global system for mobile communications ("GSM") network, an IMS network, a code division multiple access ("CDMA") network, etc.) associated with listener device 220, a geographic location associated with listener device 220, a device identifier (e.g., a phone number, a mobile directory number ("MDN"), an international subscriber directory number ("ISDN"), an international mobile equipment identity ("IMEI"), an international mobile subscriber identity ("IMSI"), etc.) associated with listener device 220, etc.

In some implementations, device manager 410 may perform operations associated with generating encryption information for listener device 220. For example, device manager 410 may generate a key pair (e.g., a public key and a private key), and may associate the key pair with listener device 220. Device manager 410 may use any type of encryption to send secure communications to listener device 220.

Access manager 420 may perform operations associated with controlling access to listener device 220. In some implementations, access manager 420 may receive and/or store information that identifies controller device 210 and/or a user associated with controller device 210, and may permit or deny access to listener device 220, by controller device 210, based on the identified controller device 210 and/or the identified user. Additionally, or alternatively, access manager 420 may receive and/or store an authentication credential (e.g., a password, an encryption key, an IP address, etc.) associated with controller device 210, and may permit or deny access to listener device 220, by controller device 210, based on the authentication credential.

In some implementations, access manager 420 may receive (e.g., from controller device 210) and/or store a command (e.g., a command that causes listener device 220 to perform an operation, such as launching an application, sending information, sending a location, sending a signal strength, etc.), and may permit or deny access to listener device 220, by controller device 210, based on the command. Additionally, or alternatively, access manager 420 may receive and/or store a network condition (e.g., time of day, type of network, etc.), and may permit or deny access to listener device 220, by controller device 210, based on the network condition.

Additionally, or alternatively, access manager 420 may receive and/or store historical access information (e.g., a quantity of accesses by a user and/or controller device 210, a quantity of accesses within a particular time period by a user and/or controller device 210, an amount of time that has lapsed since the last access by a user and/or controller device 210, etc.), and may permit or deny access to listener device 220, by controller device 210, based on the historical access information. Additionally, or alternatively, access manager 420 may receive and/or store a polling frequency, which may be associated with a network condition. The polling frequency may indicate how often listener device 220 and gateway device 230 should communicate (e.g., by sending stored commands and/or information).

Additionally, or alternatively, access manager 420 may receive and/or store token information (e.g., a quantity of available tokens associated with a user and/or controller device 210, a quantity of available tokens per command associated with a user and/or controller device 210, a quantity of available tokens, associated with a user and/or controller device 210, per network condition, a token type, etc.), and may permit or deny access to listener device 220, by controller device 210, based on the token information.

Command handler 430 may perform operations associated with handling commands. For example, command handler 430 may receive a command (e.g., from controller device 210). The command may identify listener device 220 for receipt of the command. In some implementations, command handler 430 may determine whether to provide the command to listener device 220 based on the command, listener device information associated with the command, the user and/or controller device 210 associated with the command, and/or other access management information (e.g., an authentication credential, a network condition, historical access information, token information, etc.).

In some implementations, command handler 430 may provide the command to listener device 220. Additionally, or alternatively, command handler 430 may determine a messaging protocol (e.g., an IP via IMS protocol, a multimedia messaging service ("MMS") protocol, a short message service ("SMS") protocol, etc.) to use when delivering the command to listener device 220.

Message handler 440 may perform operations associated with receiving information, storing the information for transmission, and/or transmitting the information. In some implementations, message handler 440 may store a command, received from controller device 210, for transmission to listener device 220. Message handler 440 may transmit stored commands periodically, for example, based on a polling frequency stored by access manager 420. The polling frequency may be based on a network condition. For example, there may be a different polling frequency (e.g., less often) during peak hours than during offpeak hours. Additionally, or alternatively, message handler 440 may transmit a notification to listener device 220, indicating that there is a command stored by message handler 440 that is ready for transmission to listener device 220. Message handler 440 may transmit the stored command based on receiving an indication that listener device 220 is ready to receive the stored command.

Figure 5:
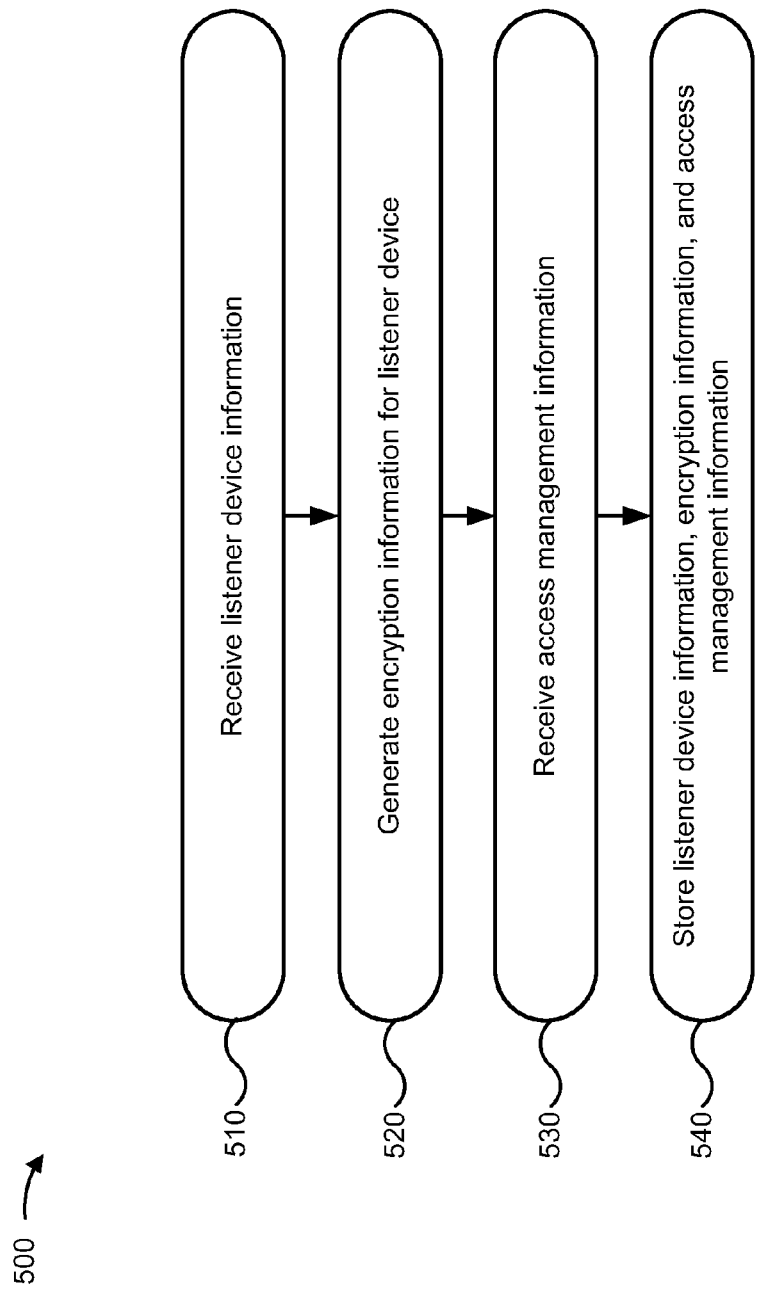
FIG. 5 is a diagram of an example process for gathering and storing information according to an implementation described herein.

FIG. 5 is a diagram of an example process 500 for gathering and storing information. In some implementations, one or more process blocks of FIG. 5 may be performed by one or more components of gateway device 230.

As shown in FIG. 5, process 500 may include receiving listener device information (block 510). Listener device information may include an address associated with listener device 220, a type of network associated with listener device 220, a geographic location associated with listener device 220, a device identifier associated with listener device 220, encryption information associated with listener device 220, and/or other information associated with listener device 220, as discussed herein in connection with FIG. 4. In some implementations, device manager 410 may receive and/or store the listener device information.

As further shown in FIG. 5, process 500 may include generating encryption information for a listener device (block 520). Encryption information may include an encryption key pair (e.g., a public key and a private key), and/or any other information that may be used to securely communicate with listener device 220. In some implementations, device manager 410 may receive, generate and/or store encryption information.

As shown in FIG. 5, process 500 may include receiving access management information (block 530). Access management information may include a command, a controller device 210 associated with the command, a user associated with the command, listener device information associated with the command, an authentication credential (e.g., associated with the command, controller device 210, a user, and/or listener device 220), a network condition (e.g., a current network condition, a historical network condition, an expected network condition, etc., associated with network 240), historical access information (e.g., associated with controller device 210 and/or a user), a polling frequency (e.g., based on a network condition), token information (e.g., associated with the command, a user, controller device 210, listener device 220, and/or the network condition), and/or other information associated with controlling access to listener device 210, as discussed herein in connection with FIG. 4. In some implementations, access manager 420 may receive, store, and/or update the access management information.

Returning to FIG. 5, process 500 may include storing the listener device information, the encryption information, and/or the access management information (block 540). In some implementations, device manager 410 and/or access manager 420 may store the listener device information, the encryption information, and/or the access management information in a data structure, such as a database, a table, etc.

FIG. 6 is a diagram of an example data structure 600 that stores listener device information. Data structure 600 may be stored in a memory device (e.g., a RAM, a hard disk, etc.), associated with one or more devices and/or components shown in FIGS. 2-4. For example, data structure 600 may be stored by gateway device 230.

Data structure 600 may include a collection of fields, such as a listener device identifier ("ID") field 610, an address field 620, a network type field 630, and a geographic location field 640. Data structure 600 includes fields 610-640 for explanatory purposes. In practice, data structure 600 may include additional fields, fewer fields, different fields, or differently arranged fields than are described with respect to data structure 600.

Listener device ID field 610 may store information that identifies listener device 220. For example, listener device ID field 610 may store a phone number, an MDN, an ISDN, an IMEI, an IMSI, and/or any other information that identifies listener device 220.

Address field 620 may store information that identifies an address associated with listener device 220 identified by listener device ID field 610. For example, address field 620 may store an IP address (e.g., an IPv4 address, an IPv6 address, etc.) associated with listener device 220. Additionally, or alternatively, address field 620 may store a phone number associated with listener device 220. In some implementations, command handler 430 may use the address stored in address field 620 (e.g., an IPv6 address, an IMS address, etc.) to send commands to listener device 220.

Network type field 630 may store information that identifies a network type associated with listener device 220 identified by listener device ID field 610. In some implementations, network type field 630 may identify a network to which listener device 220 is connected. For example, network type field 630 may indicate that listener device 220 is connected to an LTE network, an IMS network, a GSM network, an eHRPD network, a CDMA network, and/or any other type of network.

Geographic location field 640 may store information that identifies a geographic location associated with listener device 220 identified by listener device ID field 610. In some implementations, geographic location field 640 may identify a geographic location in which listener device 220 is located. For example, geographic location field 640 may store a territory (e.g., a city, a state, a country, etc.), a geo-coordinate (e.g., a latitude and/or a longitude), and/or any other information that indicates a geographical location associated with listener device 220.

Information associated with a single listener device 220 may be conceptually represented as a row in data structure 600. For example, the first row in data structure 600 may correspond to listener device 220 identified by the phone number "555-123-4567," with an IPv6 address of "2001:0db8:85a3:0000:0000:8a2e:0370:7334," connected to an "LTE" network, and located in "Washington, D.C."

FIG. 7 is a diagram of an example data structure 700 that stores access management information. Data structure 700 may be stored in a memory device (e.g., a RAM, a hard disk, etc.), associated with one or more devices and/or components shown in FIGS. 2-4. For example, data structure 700 may be stored by gateway device 230.

Data structure 700 may include a collection of fields, such as a user field 705, a command field 710, a network condition field 715, a maximum tokens per cycle field 720, an available tokens this cycle field 725, a total available tokens field 730, and an access interval field 735. Data structure 700 includes fields 705-735 for explanatory purposes. In practice, data structure 700 may include additional fields, fewer fields, different fields, or differently arranged fields than are described with respect to data structure 700.

User field 705 may store information that identifies a user. In some implementations, a user may be associated with controller device 210 and/or listener device 220. For example, a user may be associated with controller device 210 that sends commands via gateway device 230 to listener device 220. A user may be identified by a user name, a controller device 210 associated with the user, and/or any other information that may be used to identify a user.

Command field 710 may store information that identifies a command associated with the user identified by user field 705. The command may be an instruction, destined for listener device 220 via gateway device 230, that instructs listener device 220 to perform an operation. For example, the command may wake listener device 220 out of sleep mode (e.g., "WakeUp"), may cause listener device 220 to send a geographic location associated with listener device 220 to controller device 210 (e.g., "GetLocation"), and/or may cause listener device 220 to perform any other operation (e.g., send a device parameter associated with listener device 220, such as a signal strength, a battery level, etc.). In some implementations, a command may be associated with a command type (e.g., "WakeUp," "GetLocation," etc.). Additionally, or alternatively, command field 710 may identify multiple commands associated with the user identified by user field 705 (e.g., "All" commands associated with "XYZ Inc," as illustrated).

Network condition field 715 may store information that identifies a network condition under which the user identified by field 705 may send the command identified by command field 710 to listener device 220. A network condition may include a time period (e.g., a time period associated with a network traffic load; e.g., after 7 a.m. and before 7 p.m., which may be identified as "peak" hours; after 7 p.m. and before 7 a.m., which may be identified as "offpeak" hours; etc.), a network type (e.g., LTE, IMS, GMS, CDMA, etc.) associated with listener device 220, a parameter (e.g., a signal strength indicator value, a battery strength indicator value, a signal to noise ratio, etc.) associated with listener device 220, a geographic location (e.g., a particular city, state, country, etc.) associated with listener device 220, a service state (e.g., roaming, non-roaming, home, etc.) associated with listener device 220, etc.

Maximum tokens per cycle ("MTC") field 720 may store information that identifies a maximum quantity of times, during a particular time period, that the user identified by field 705 may send the command and/or the command type identified by command field 710 to listener device 220 under the network conditions identified by network condition field 715. For example, gateway device 230 may permit ABC Corp to send a maximum of 30 "WakeUp" commands per day to listener device 220 during offpeak hours, and when listener device 220 is connected to an LTE network, as illustrated by the first row in data structure 700.

Available tokens this cycle ("ATC") field 725 may store information that identifies a quantity of times (based on an available quantity of tokens), during a particular time period, that the user identified by field 705 may send the command and/or the command type identified by command field 710 to listener device 220 under the network conditions identified by network condition field 715. For example, ABC Corp may have 10 tokens available in a cycle, and each token may permit ABC Corp to send a "WakeUp" command to listener device 220 during offpeak hours, and when listener device 220 is connected to an LTE network, as illustrated by the first row in data structure 700.

ATC field 725 may identify a quantity of available tokens in a current cycle associated with a user, a command (and/or a command type), and/or a network condition. In some implementations, the quantity of available tokens in the current cycle may be decreased. For example, each time ABC Corp sends the WakeUp command to listener device 220 during offpeak hours, and when listener device 220 is connected to an LTE network, the quantity of available tokens may be decreased by one. Additionally, or alternatively, the quantity of available tokens in the current cycle may be increased. For example, once a cycle expires, the quantity of available tokens in the current cycle may be increased (e.g., to the lesser of total available tokens (field 730) or maximum tokens per cycle (field 720)).

In some implementations, a user may purchase additional tokens for use in the current cycle. For example, assume that the maximum tokens per cycle is 30. If a user has 15 total tokens, and uses 5 in the current cycle, the user will have 10 tokens remaining. In this scenario, the user may purchase up to 15 tokens for use in the current cycle (e.g., 5 used+10 remaining+15 purchased=30 maximum). However, assume that the maximum tokens per cycle is 15. If a user has 15 total tokens, and uses 5 in the current cycle, the user will have 10 tokens remaining In this scenario, the user may not purchase additional tokens for use in the current cycle because the purchase would exceed the maximum tokens per cycle. However, the user may purchase tokens for use in another cycle (e.g., to increase the value in field 730).

Total available tokens ("TAT") field 730 may store information that identifies a quantity of tokens associated with the user identified by field 705, the command and/or the command type identified by field 710, and the network condition identified by field 715. For example, ABC Corp may have 25 total tokens available for sending a WakeUp command to listener device 220 during offpeak hours, and when listener device 220 is connected to an LTE network, as illustrated by the first row in data structure 700.

TAT field 730 may identify a total quantity of available tokens associated with a user, a command (and/or a command type), and/or a network condition. In some implementations, the total quantity of available tokens may be decreased. For example, each time ABC Corp sends the WakeUp command to listener device 220 during offpeak hours, and when listener device 220 is connected to an LTE network, the total quantity of available tokens may be decreased by one. Additionally, or alternatively, the total quantity of available tokens may be increased. For example, ABC Corp may purchase additional tokens.

In the scenario indicated by the first row of data structure 700, ABC Corp may have already used 20 tokens in the current cycle, and may have 10 remaining tokens available to use in the current cycle. Even though ABC Corp has 25 total tokens, the 15 additional tokens (25 total minus 10 available in the current cycle) cannot be used in the current cycle because such use would exceed the maximum tokens per cycle.

Access interval field 735 may store information that identifies an access interval associated with the user identified by field 705, the command and/or the command type identified by field 710, and the network condition identified by field 715. An access interval may indicate a period of time between transmitting successive commands (e.g., associated with a particular command type). For example, ABC Corp may provide the WakeUp command 30 times per day, but must wait 30 minutes between successive command transmissions.

Information associated with a user, a command (and/or a command type), and/or a network condition may be conceptually represented as a row in data structure 700. For example, the second row in data structure 700 may correspond to a user identified by user name "ABC Corp," a command identified by the command type "WakeUp," and a network condition of "any other." The network condition of "any other" may include a network condition that is not associated with "ABC Corp" in another row in data structure 700. For example, "any other" in the second row of data structure 700 may include a network condition of non-offpeak hours, and/or when listener device 220 is connected to a non-LTE network. Under non-offpeak, non-LTE network conditions, there is no maximum quantity of times ("Unlimited") that ABC Corp may send the WakeUp command. ABC Corp has 5 tokens available to send the WakeUp command under non-offpeak, non-LTE network conditions, but may purchase and/or otherwise acquire an unlimited quantity of tokens to send the WakeUp command under non-offpeak, non-LTE conditions.

Figure 8:
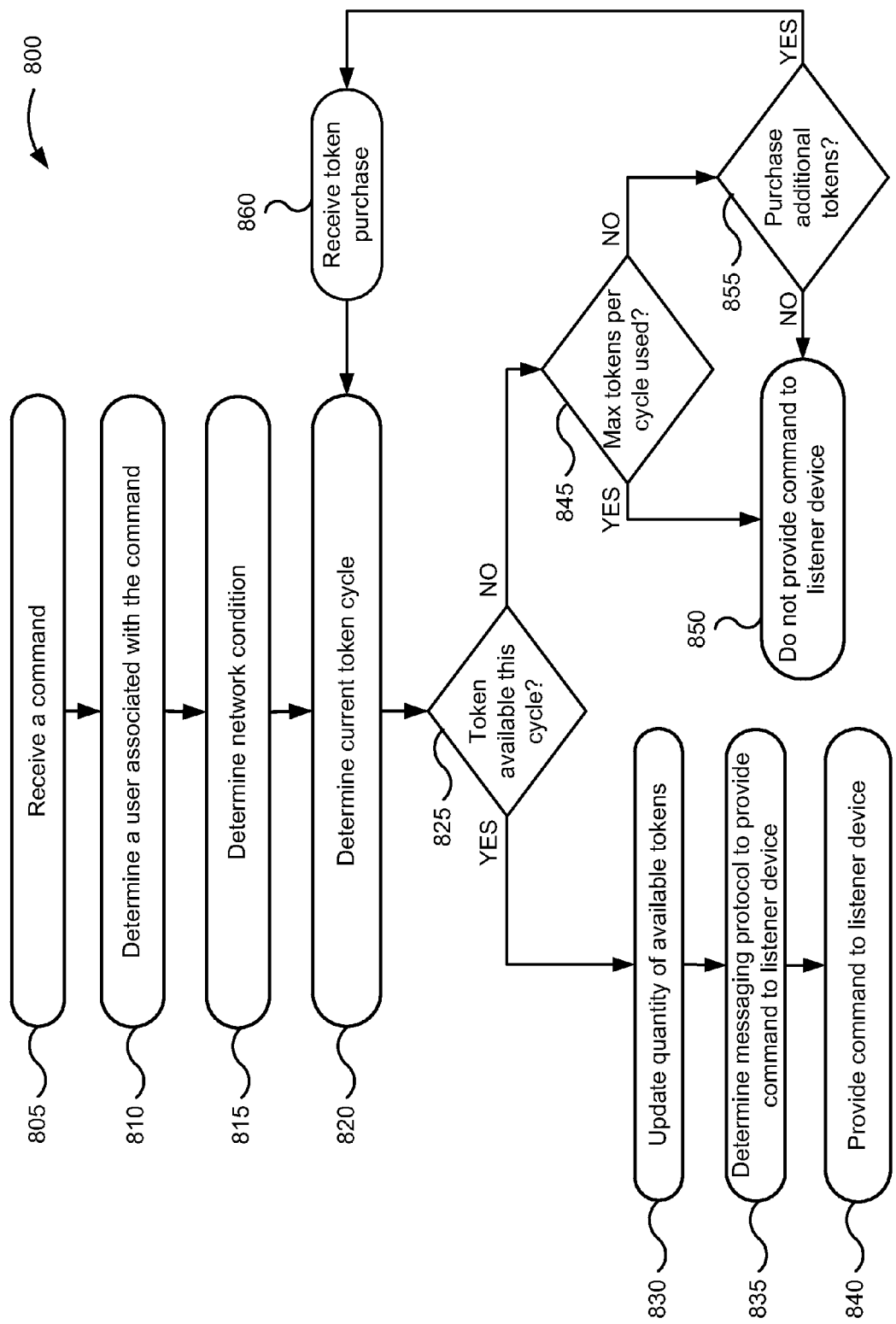
FIG. 8 is a diagram of an example process for determining whether to provide a command to a listener device according to an implementation described herein.

FIG. 8 is a diagram of an example process 800 for determining whether to provide a command to listener device 220. In some implementations, one or more process blocks of FIG. 8 may be performed by one or more components of gateway device 230.

As shown in FIG. 8, process 800 may include receiving a command (block 805). In some implementations, command handler 430 may receive the command from controller device 210. For example, controller device 210 may send a command, intended for receipt by listener device 220, to command handler 430. Additionally, or alternatively, command handler 430 may receive a command on a periodic basis. For example, controller device 210 may send a command to command handler 430 on a periodic basis. Additionally, or alternatively, command handler 430 may store a command associated with a polling frequency, and may process the stored command periodically based on the polling frequency.

In some implementations, listener device 220 may send a notification to command handler 430 based on a device event (e.g., a particular fraction of storage space being used on listener device 220, a particular amount of information being stored and/or queued for transmission on listener device 220, etc.) associated with listener device 220. Command handler 430 may send a notification to controller device 210 based on the notification received from listener device 220, and controller device 210 may send a command to command handler 430 based on the notification received from command handler 430. Additionally, or alternatively, command handler 430 may store one or more commands, and may process the commands when the notification is received from listener device 220. In some implementations, command handler 430 may continuously monitor for notifications. Additionally, or alternatively, command handler 430 may receive a notification and/or check for a notification on a periodic basis.

As further shown in FIG. 8, process 800 may include determining a user associated with the command (block 810). In some implementations, the command may include information that identifies a user. For example, command handler 430 may receive a command from controller device 210, and the command and/or controller device 210 may be associated with a user.

As still further shown in FIG. 8, process 800 may include determining a network condition (block 815). In some implementations, command handler 430 may monitor network 240 to determine a network condition. Additionally, or alternatively, command handler 430 may continuously and/or periodically receive information that identifies a network condition associated with network 240 (e.g., from a device associated with network 240). The network condition may include whether network 240 is operating during peak hours or off-peak hours at the time the information that identifies the network condition is transmitted and/or received.

In some implementations, the network condition may include listener device information. For example, the command may identify a listener device 220 associated with the command. In some implementations, the network condition may include a type of listener device 220, an identity of a listener device 220, and/or a geographic location associated with listener device 220. Additionally, or alternatively, the network condition may include a network type (e.g., LTE, GSM, IMS, etc.) associated with listener device 220 (e.g., a network type to which listener device 220 is connected). Additionally, or alternatively, the network condition may include whether listener device 220 is roaming or non-roaming. Additionally, or alternatively, the network condition may include an operating parameter (e.g., a battery strength, a signal strength, a signal to noise ratio, a quantity or fraction of available storage space, etc.) associated with listener device 220.

As shown in FIG. 8, process 800 may include determining a current token cycle (block 820). In some implementations, command handler 430 may determine a maximum quantity of tokens, associated with a user, a command (and/or a command type), and/or a network condition, that may be used during a particular token cycle. A token cycle may include a particular time period (e.g., a minute, an hour, a day, a week, a month, a year, etc.). In some implementations, command handler 430 may keep track of and/or may limit a quantity of tokens used during the token cycle. Once the token cycle has lapsed, command handler 430 may reset the quantity of tokens used in the next token cycle.

In some implementations, a token may be used by a particular user to provide a command (e.g., any command, a set of commands, a particular command, a command associated with a command type) to listener device 220. Additionally, or alternatively, a token may be used during a particular network condition. Additionally, or alternatively, a token may be used to provide a command from a particular controller device 210 and/or to a particular listener device 220.

As further shown in FIG. 8, process 800 may include determining whether a token, associated with the user, the command (and/or a command type), and/or the network condition, is available during a current token cycle (block 825). In some implementations, command handler 430 may query a data structure (e.g., data structure 700) to determine whether a token, associated with the user, the command, and/or the network condition, is available in the current token cycle.

As shown in FIG. 8, if a token is available during the current token cycle (block 825—YES), process 800 may include updating a quantity of available tokens (block 830), determining a messaging protocol to provide the command to the listener device (block 835), and providing the command to the listener device (block 840).

In some implementations, command handler 430 may update, in a data structure (e.g., data structure 700), information that identifies a quantity of available tokens. For example, command handler 430 may decrement a total quantity of available tokens (e.g., stored in field 730 of data structure 700) and/or a quantity of tokens available in the current token cycle (e.g., stored in field 725 of data structure 700).

In some implementations, command handler 430 may determine a messaging protocol to provide the command to listener device 220 based on a network type to which listener device 220 is connected. For example, when listener device 220 is attached to an LTE and/or an IMS network, command handler 430 may provide the command to listener device 220 via a direct IP attachment. When listener device 220 is not attached to an LTE and/or an IMS network, command handler 430 may provide the command to listener device 220 via MMS messaging and/or SMS messaging.

In some implementations, command handler 430 may use a token hierarchy to determine whether a token is available. For example, a user may have a general use token and a priority token. The general use token may be associated with a network condition, and a priority token may be available for use regardless of the network condition. In this example, command handler 430 may first determine whether a general use token is available based on the current network conditions and the network conditions associated with the general use token. If a general use token is not available, command handler 430 may determine whether a priority token is available.

As shown in FIG. 8, if a token is not available during the current cycle (block 825—NO), process 800 may include determining whether a maximum quantity of tokens has been used in the current token cycle (block 845). In some implementations, a network operator may specify a maximum quantity of tokens, associated with a user, a command, a command type, and/or a network condition, that may be used during a particular token cycle. Command handler 430 may query a data structure (e.g., data structure 700) to determine whether a maximum quantity of tokens, associated with the user, the command, the command type, and/or the network condition, has been used in the current token cycle.

As shown in FIG. 8, if the maximum quantity of tokens has been used in the current token cycle (block 845—YES), process 800 may include not providing a command to the listener device (block 850). For example, if a user has exceeded a threshold quantity (e.g., a maximum quantity of tokens) for providing a specified command to listener device 220 under specified network conditions during a particular time period (e.g., a token cycle), command handler 430 may not permit the user to send the command to listener device 220 during the remainder of the particular time period.

As shown in FIG. 8, if the maximum quantity of tokens has not been used in the current token cycle (block 845—NO), process 800 may include receiving information that indicates whether a user desires to purchase one or more additional tokens (block 855). For example, command handler 430 may transmit token information to a user (e.g., to controller device 210 and/or to another device associated with the user). The token information may indicate that the user does not have any available tokens for a particular command and/or network condition. The token information may also allow a user to specify whether the user desires to purchase additional tokens. Command handler 430 may receive, from controller device 210 and/or another device (e.g., associated with a user), a request to purchase additional tokens and/or may receive a request not to purchase additional tokens.

As shown in FIG. 8, if a request is received that indicates that a user does not desire to purchase additional tokens (or if no response is received) (block 855—NO), process 800 may include not providing a command to the listener device (block 850), as discussed above.

As shown in FIG. 8, if a request is received that indicates that a user desires to purchase additional tokens (block 855—YES), process 800 may include receiving a token purchase (block 860), and returning to process block 820 (or, in some implementations, to process block 825 or process block 830). In some implementations, access manager 420 may determine a quantity of tokens purchased by the user, and may update a data structure (e.g., data field 725 and/or data field 730 of data structure 700) based on the purchase.

Figure 9:
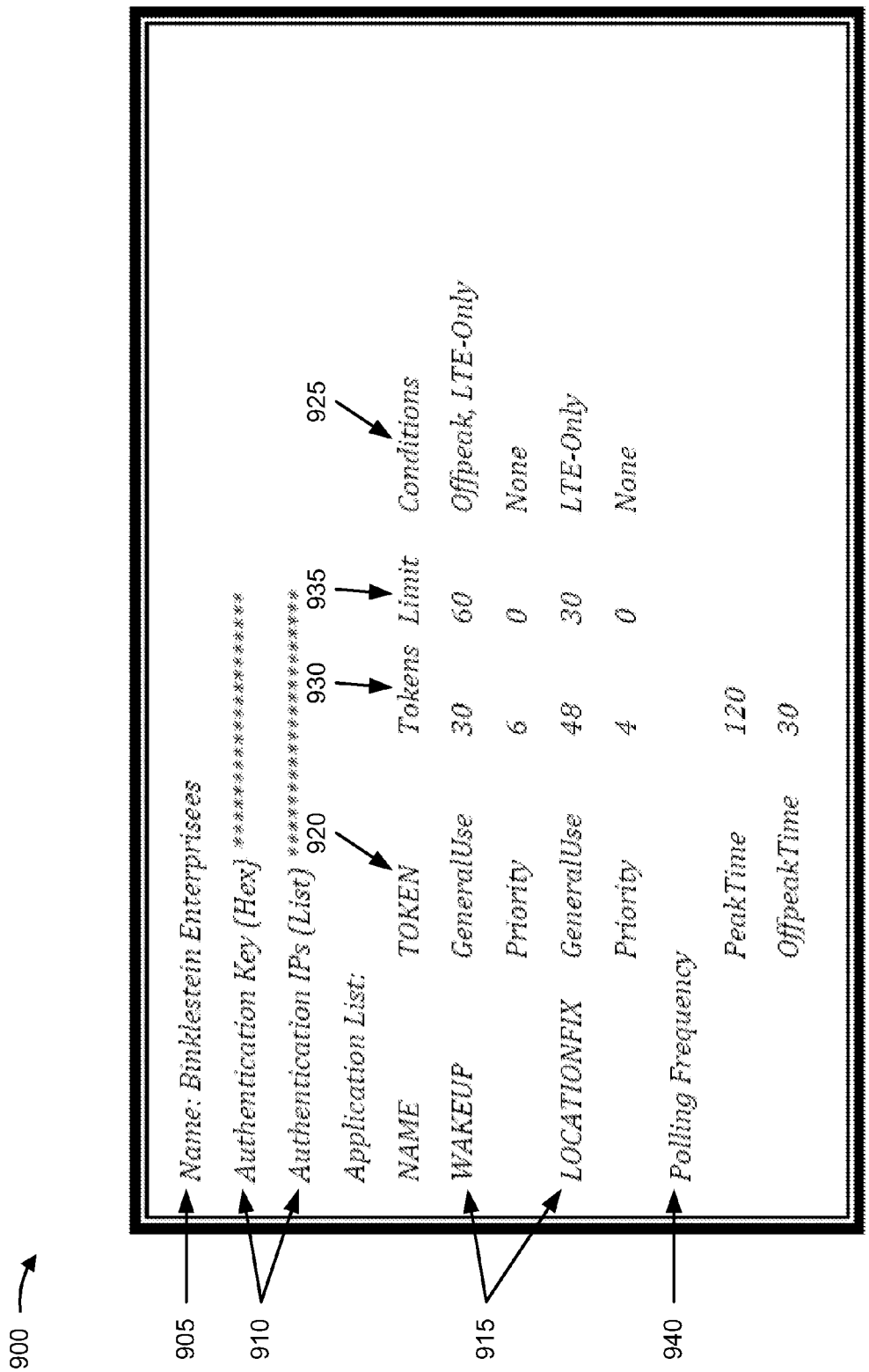
FIG. 9 is a diagram of example access management information described herein.

FIG. 9 is a diagram of example access management information 900 described herein. Assume that access management information 900 represents information associated with a user 905. For example, user 905, as illustrated, may be identified as "Binklestein Enterprises."

In some implementations, gateway 230 may store authentication credentials 910 associated with Binklestein Enterprises, such as an authentication key and/or one or more authentication IP addresses. The authentication key may be associated with an encryption key pair, which may allow controller device 210 associated with Binklestein Enterprises to transmit encrypted data to listener device 220 via gateway device 230. Additionally, or alternatively, the authentication key may be a password used to authenticate controller device 210 associated with Binklestein Enterprises. In some implementations, an authentication IP address may include one or more IP addresses that identify controller devices 210 associated with Binklestein Enterprises. Gateway device 230 may only permit controller devices 210 with authenticated IP addresses to send a command to listener device 220.

In some implementations, gateway device 230 may store one or more commands 915 associated with user 905. For example, gateway device 230 may allow user 905 to register commands 915. For example, controller device 210 and/or listener device 220 may transmit command 915 to gateway device 230, and may request that command 915 be registered by gateway device 230. Registering command 915 may permit controller device 210 to transmit command 915 to listener device 220.

As illustrated, Binklestein Enterprises may register a "WAKEUP" command and a "LOCATIONFIX" command. In some implementations, commands 915 may be associated with a token type 920. Additionally, or alternatively, commands 915 may be associated with a network condition 925, a quantity of available tokens during a time period (item 930), and/or a limit 935. In some implementations, limit 935 may include a time interval between successive command transmissions. Additionally, or alternatively, limit 935 may include a maximum quantity of tokens per cycle.

As illustrated in FIG. 9, the WAKEUP command for Binklestein Enterprises may be associated with a general use token and a priority token. The general use token for the WAKEUP command can only be used when the network condition is offpeak (e.g., during offpeak hours) and LTE-Only (e.g., when listener device 220, to which the command is to be sent, is connected to an LTE network). The priority token for the WAKEUP command can be used at any time (e.g., the specified conditions are "none").

In this example, Binklestein Enterprises may have thirty (30) general use tokens available to use to provide the WAKEUP command when the network conditions are offpeak and LTE-Only. Limit 935 may indicate that successive WAKEUP commands cannot be provided less than sixty (60) minutes apart. Additionally, or alternatively, limit 935 may indicate that Binklestein Enterprises may not use more than sixty (60) general use tokens, in a particular time period, to provide the WAKEUP command when the network conditions are offpeak and LTE-Only.

As illustrated in FIG. 9, Binklestein Enterprises may have six (6) priority tokens available for use to provide the WAKEUP command anytime, and there may be no limit associated with the priority tokens that Binklestein Enterprises may use for the WAKEUP command. Thus, if Binklestein Enterprises cannot use a general use token (e.g., due to the time interval limit and/or due to exceeding a maximum quantity of tokens per cycle), Binklestein Enterprises may use a priority token to send the WAKEUP command.

As further illustrated in FIG. 9, the LOCATIONFIX command for Binklestein Enterprises may be associated with a general use token and a priority token. The general use token for the LOCATIONFIX command can only be used when the network condition is LTE-Only (e.g., when listener device 220, to which the command is to be sent, is connected to an LTE network). The priority token for the LOCATIONFIX command can be used at any time (e.g., the specified conditions are "none").

In this example, Binklestein Enterprises may have forty-eight (48) general use tokens available to use to provide the LOCATIONFIX command when the network conditions are LTE-Only. Limit 935 may indicate that successive LOCATIONFIX commands cannot be provided less than thirty (30) minutes apart. Additionally, or alternatively, limit 935 may indicate that Binklestein Enterprises may not use more than thirty (30) general use tokens, in a particular time period, to provide the LOCATIONFIX command when the network condition is LTE-Only.

As illustrated in FIG. 9, Binklestein Enterprises may have four (4) priority tokens available for use to provide the LOCATIONFIX command anytime, and there may be no limit associated with the priority tokens that Binklestein Enterprises may use for the LOCATIONFIX command.

In some implementations a user may purchase additional tokens. The cost of a token may be based on token type 920 associated with the token. For example, a priority token may cost more than a general use token. Additionally, or alternatively, a user may be given (e.g., via a subscription) a particular quantity of tokens for use in a particular time period (e.g., 30 tokens per month). When the particular time period has lapsed (e.g., a new month begins), the user may be given the particular quantity of tokens for the next time period (e.g., 30 tokens in the new month). In some implementations, a user may be given fewer priority tokens than general use tokens per time period.

In some implementations, there may be multiple token types 920. Each token type 920 may be associated with a different set of network conditions 925, a different quantity of available tokens during a time period (item 930), and/or a different limit 935. Additionally, or alternatively, each token type 920 may be associated with a different cost. In some implementations, a mechanism other than a token may be used to control access to listener device 220.

In some implementations, gateway device 230 may store a polling frequency 940 associated with user 905. Additionally, or alternatively, polling frequency 940 may be based on network condition 925. For example, polling frequency 940 may be one hundred twenty (120) minutes during peak hours, and may be thirty (30) minutes during offpeak hours. In some implementations, polling frequency 940 may indicate that gateway device 230 may poll listener device 220 at one hundred twenty (120) minute intervals during peak hours (and at thirty (30) minute intervals during offpeak hours) to determine whether listener device 220 has stored information that is ready for retrieval by gateway device 230 and/or controller device 210. Additionally, or alternatively, polling frequency 940 may indicate that gateway device 230 may store commands received from controller device 210, and may transmit the stored commands to listener device 220 at one hundred twenty (120) minute intervals during peak hours (and at thirty (30) minute intervals during offpeak hours).

Figure 10:
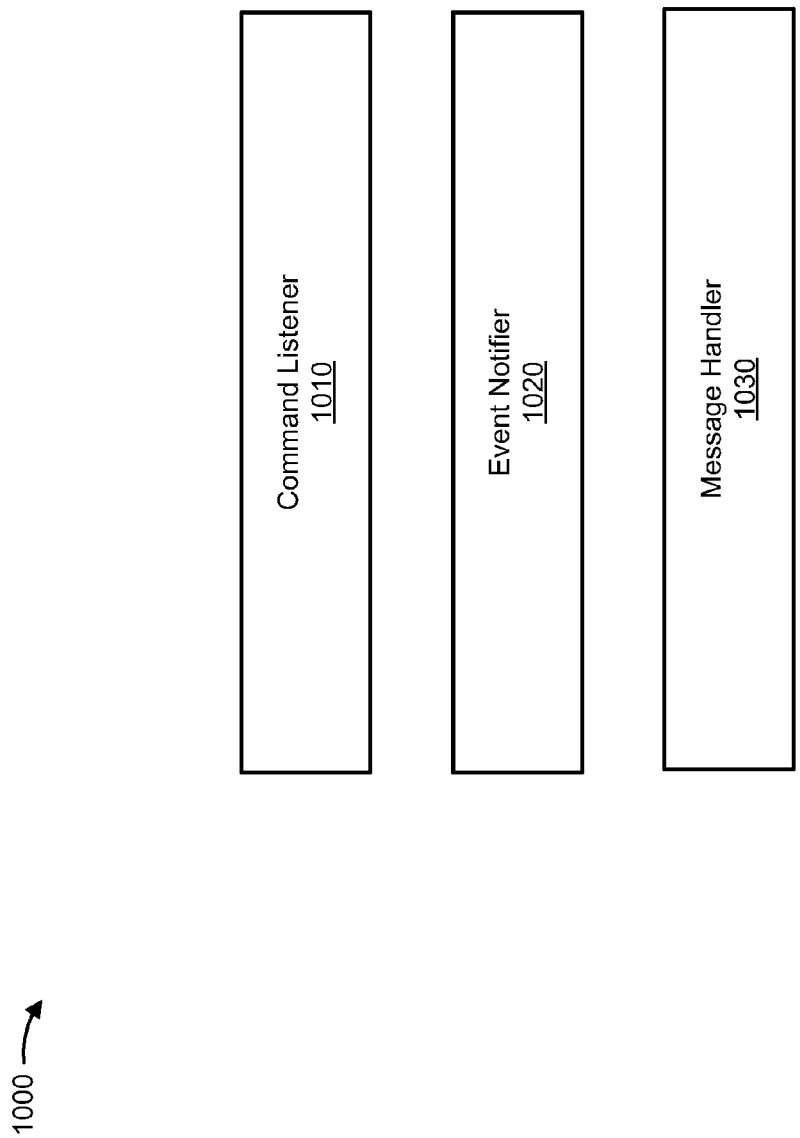
FIG. 10 is a diagram of example functional components of one or more devices of FIG. 2.

FIG. 10 is a diagram of example functional components of a device 1000, which may correspond to listener device 220. Device 1000 may include a command listener 1010, an event notifier 1020, and a message handler 1030. Each of functional components 1010-1030 may be implemented using one or more devices 300 or one or more components of device 300 (FIG. 3). Listener device 220 may individually include all of the functional components depicted in FIG. 10, or the functional components depicted in FIG. 10 may be distributed singularly or duplicatively in any manner between the devices illustrated in FIG. 2. In some implementations, listener device 220 may include other functional components (not shown) that aid in receiving a command.

Command listener 1010 may perform operations associated with monitoring for and/or receiving a command. In some implementations, command listener 1010 may continuously monitor for a command, such as a command from controller device 210 and/or gateway device 230. Additionally, or alternatively, command listener 1010 may check for a command periodically based on a time period (e.g., a second, a minute, an hour, a day, based on a polling frequency, etc.).

Additionally, or alternatively, command listener 1010 may receive a command based on a command transmission by controller device 210 and/or gateway device 230. Additionally, or alternatively, command listener 1010 may periodically receive a command (e.g., from controller device 210 and/or gateway device 230). In some implementations, command listener 1010 may be associated with an address (e.g., an IPv6 address, an IMS address, etc.), and may listen for commands received at the address.

Figure 11:
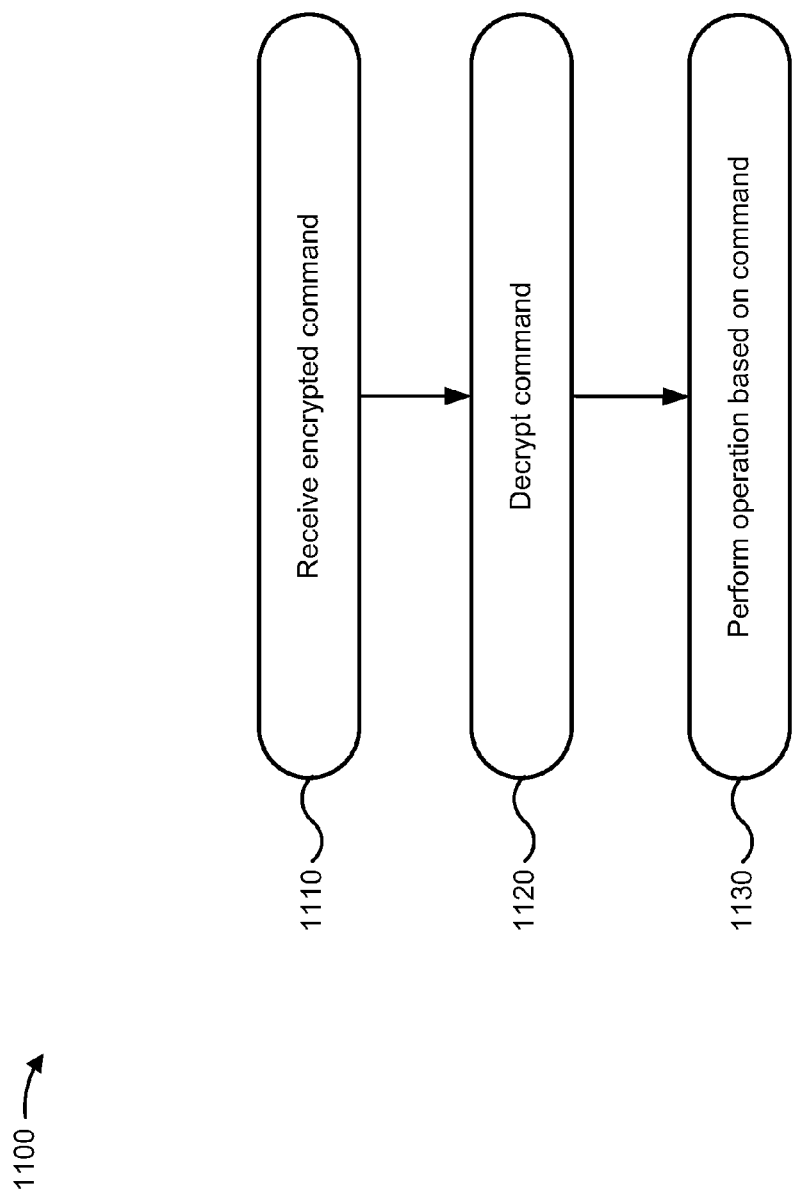
FIG. 11 is a diagram of an example process for receiving and responding to a command according to an implementation described herein.

FIG. 11 is a diagram of an example process 1100 for receiving and responding to a command. In some implementations, one or more process blocks of FIG. 11 may be performed by one or more components of listener device 220.

As shown in FIG. 11, process 1100 may include receiving an encrypted command (block 1110). For example, command listener 1010 may receive a command encrypted via an encryption key pair generated by gateway device 230. In some implementations, command listener 1010 may receive the command from gateway device 230 and/or controller device 210. Additionally, or alternatively, command listener 1010 may receive the command from controller device 210 once permission to access listener device 220 has been granted to controller device 210 by gateway device 230.

As further shown in FIG. 11, process 1100 may include decrypting the command (block 1120). For example, command listener 1010 may decrypt the command using an encryption algorithm and/or an encryption key pair generated by gateway device 230. In some implementations, command listener 1010 may notify gateway 230 when it receives a command from an untrusted source (e.g., a command that is not properly encrypted).

As still further shown in FIG. 11, process 1100 may include performing an operation based on the command (block 1130). In some implementations, the command may instruct command listener 1010 to perform the operation (e.g., launching an application, sending information to a device, such as controller device 210, etc.). Additionally, or alternatively, command listener 1010 may perform the operation in response to receiving the command. In some implementations, command listener 1010 may use one network and/or address (e.g., identified by an IMS address and/or IPv6 address) to receive a command and/or launch an application. Once the application is launched, the application may run on a different network and/or may use a different address than the network and/or address used by command listener 1010. As a result, traffic used to receive commands may be kept separate from traffic used to run applications.

Returning to FIG. 10, event notifier 1020 may perform operations associated with notifying a device (e.g., gateway device 230) of an event. In some implementations, event notifier 1020 may send a notification to gateway device 230 on a periodic basis (e.g., once per second, once per minute, once per hour, once per day, at a particular time of day, etc.). Additionally, or alternatively, event notifier 1020 may send a notification to gateway device 230 based on a device event (e.g., a device event of listener device 220).

For example, listener device 220 may store information for transmission to a device (e.g., controller device 210 and/or gateway device 230). A device event may occur when listener device 220 meets or exceeds a storage capacity threshold. For example, a device event may occur when listener device 220 has reached 80% of its storage capacity (e.g., total storage capacity, storage capacity for information intended for transmission to a device, etc.). Event notifier 1020 may send a notification to gateway device 230 based on the device event. Gateway device 230 may receive the notification, as discussed in connection with process block 805 of FIG. 8, and may send a command to command listener 1010 based on the received notification.

Message handler 1030 may perform operations associated with receiving information, storing the information for transmission, and/or transmitting the information. In some implementations, message handler 1030 may store information (e.g., a geographic location, a signal strength, a battery strength, etc.) associated with listener device 220, for transmission to gateway device 230 and/or controller device 210. Message handler 1030 may transmit stored information periodically, for example, based on a polling frequency stored by access manager 420. Additionally, or alternatively, message handler 1030 may transmit a notification to gateway device 230, indicating that there is information stored by message handler 1030 that is ready for transmission to gateway device 230. Message handler 1030 may transmit the stored information based on receiving an indication that gateway device 230 is ready to receive the stored information.

Figure 12:
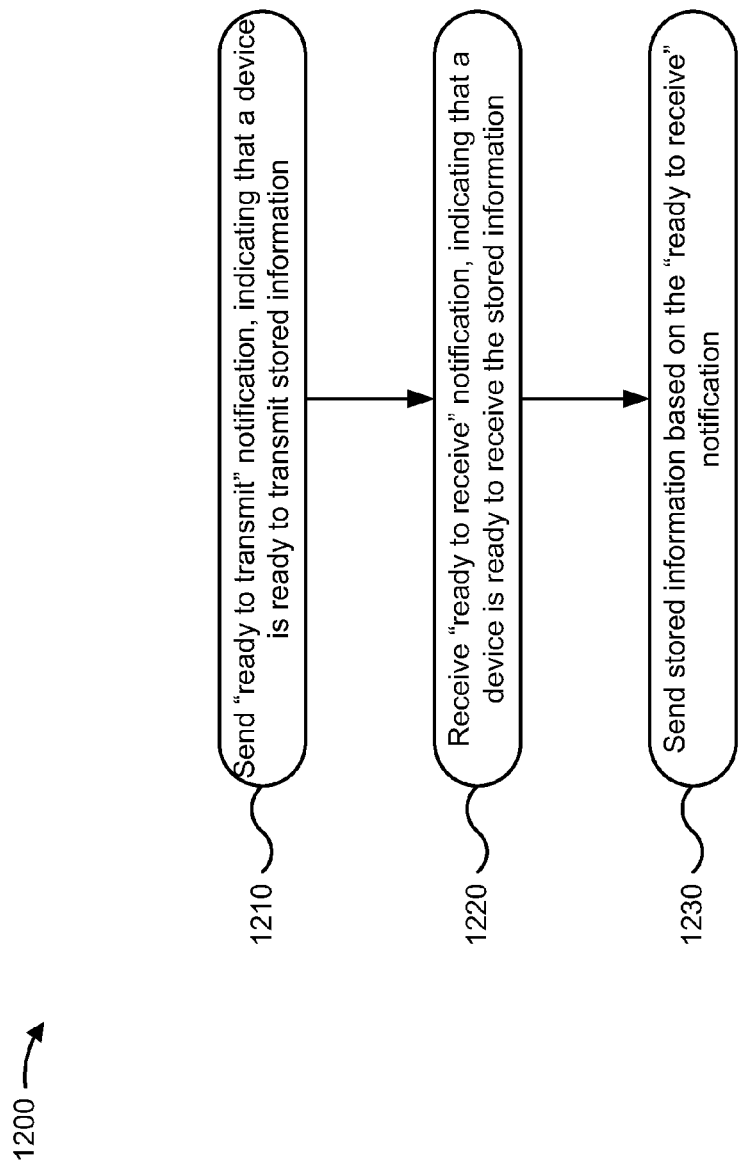
FIG. 12 is a diagram of an example process for sending stored information according to an implementation described herein.

FIG. 12 is a diagram of an example process 1200 for sending stored information. In some implementations, one or more process blocks of FIG. 12 may be performed by one or more components of listener device 220 and/or gateway device 230.

As shown in FIG. 12, process 1200 may include sending a "ready to transmit" notification, indicating that a device is ready to transmit stored information (block 1210). For example, gateway device 230 may send a "ready to transmit" notification to listener device 220 when there is a command stored by gateway device 230 that is ready for transmission to listener device 220. Similarly, listener device 220 may send a "ready to transmit" notification to gateway device 230 when there is information stored by listener device 220 that is ready for transmission to gateway device 230 (e.g., information stored based on a command). Additionally, or alternatively, the "ready to transmit" notification may be sent periodically (e.g., based on a polling frequency). Additionally, or alternatively, the "ready to transmit" notification may be sent based on a change in a network condition (e.g., a change from peak hours to offpeak hours, a change from roaming to non-roaming, a change from a non-LTE network to an LTE network, etc.).

As further shown in FIG. 12, process 1200 may include receiving a "ready to receive" notification, indicating that a device is ready to receive the stored information (block 1220). For example, listener device 220 may send a "ready to receive" notification to gateway device 230 when listener device 220 is ready to receive a command from gateway device 230. Similarly, gateway device 230 may send a "ready to receive" notification to listener device 220 when gateway device 230 is ready to receive information stored by listener device 220. Additionally, or alternatively, the "ready to receive" notification may be sent periodically (e.g., based on a polling frequency). Additionally, or alternatively, the "ready to receive" notification may be sent based on a change in a network condition.

As still further shown in FIG. 12, process 1200 may include sending stored information based on the "ready to receive" notification (block 1230). For example, listener device 220 may send stored information to gateway device 230 based on a "ready to receive" notification received from gateway device 230. Similarly, gateway device 230 may send a stored command to listener device 220 based on a "ready to receive" notification received from listener device 220. Additionally, or alternatively, the stored information may be sent periodically (e.g., based on a polling frequency). Additionally, or alternatively, the stored information may be sent based on a change in a network condition.

Figure 13:
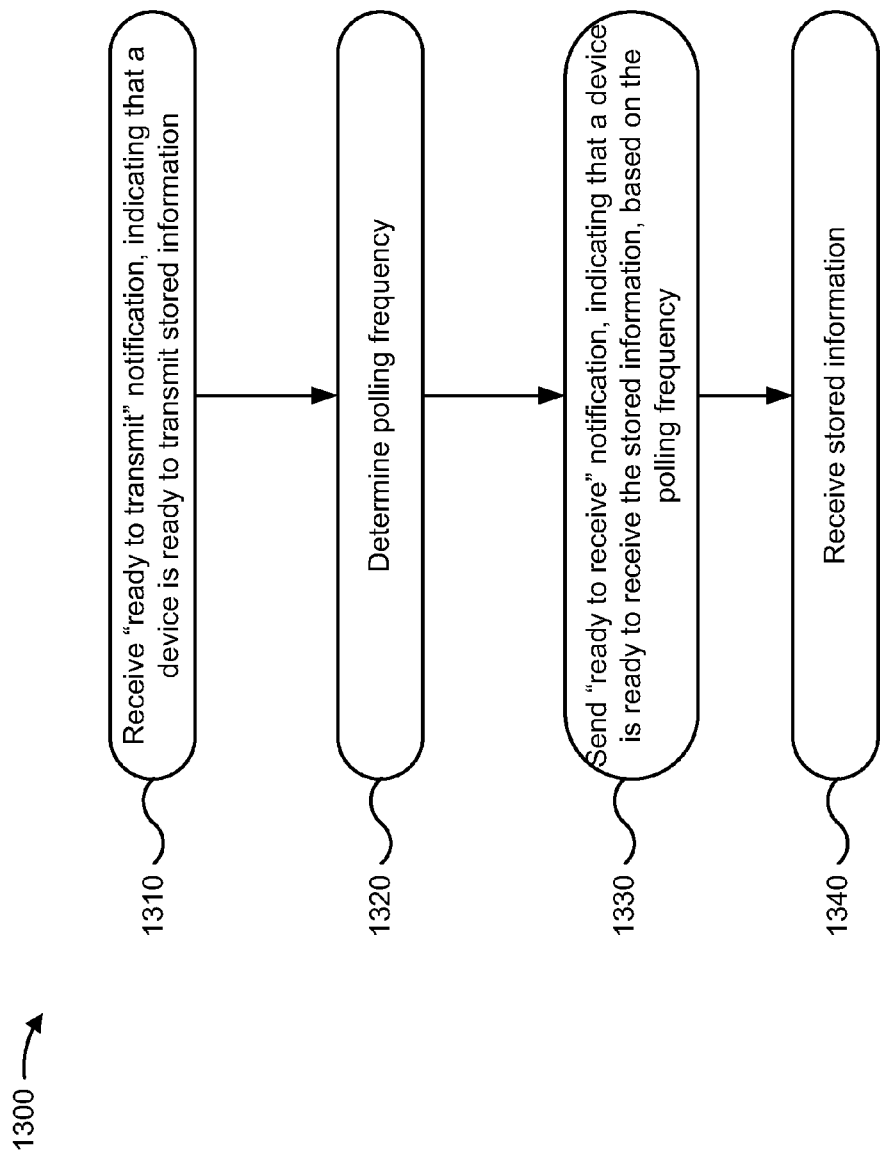
FIG. 13 is a diagram of an example process for receiving stored information according to an implementation described herein.

FIG. 13 is a diagram of an example process 1300 for receiving stored information. In some implementations, one or more process blocks of FIG. 13 may be performed by one or more components of listener device 220 and/or gateway device 230.

As shown in FIG. 13, process 1300 may include receiving a "ready to transmit" notification, indicating that a device is ready to transmit stored information (block 1310). For example, gateway device 230 may receive a "ready to transmit" notification from listener device 220 when there is information stored by listener device 220 that is ready for transmission to gateway device 230. Similarly, listener device 220 may receive a "ready to transmit" notification from gateway device 230 when there is a command stored by gateway device 230 that is ready for transmission to listener device 220. Additionally, or alternatively, the "ready to transmit" notification may be sent periodically (e.g., based on a polling frequency). Additionally, or alternatively, the "ready to transmit" notification may be sent based on a change in a network condition.

As further shown in FIG. 13, process 1300 may include determining a polling frequency (block 1320). In some implementations, the polling frequency may be stored by access manager 420. Additionally, or alternatively, the polling frequency may be based on a network condition. For example, the polling frequency may be one hundred twenty (120) minutes during peak hours, and may be thirty (30) minutes during offpeak hours.

Returning to FIG. 13, process 1300 may include sending a "ready to receive" notification, indicating that a device is ready to receive the stored information, based on the polling frequency (block 1330). For example, gateway device 230 may send the "ready to receive" notification to listener device 220 based on a polling frequency associated with the current network condition. Similarly, listener device 220 may send the "ready to receive" notification to gateway device 230 based on a polling frequency associated with the current network condition. Additionally, or alternatively, the "ready to receive" notification may be sent based on a change in a network condition.

As shown in FIG. 13, process 1300 may include receiving stored information (block 1340). For example, listener device 220 may receive a stored command from gateway device 230. Similarly, gateway device 230 may receive stored information (e.g., associated with a command) from listener device 220. In some implementations, gateway device 230 may send a notification to controller device 210 based on receiving the stored information, and controller device 210 may send a command to gateway device 230 based on the received notification. Additionally, or alternatively, the stored information may be received periodically (e.g., based on a polling frequency). Additionally, or alternatively, the stored information may be received based on a change in a network condition.

Implementations described herein may prevent network disruptions by limiting communications between a controller device and a listener device.

The foregoing disclosure provides illustration and description, but is not intended to be exhaustive or to limit the embodiments to the precise form disclosed. Modifications and variations are possible in light of the above disclosure or may be acquired from practice of the embodiments.

While series of blocks have been described with regard to FIGS. 5, 8, 11, 12, and 13, the order of the blocks may be modified in some implementations. Further, non-dependent blocks may be performed in parallel.

Certain data structures have been presented with regard to FIGS. 6 and 7. These data structures are purely examples and merely serve to facilitate the description of the storage of information.

While the data structures presented with regard to FIGS. 6 and 7 are represented as tables with rows and columns, in practice, the data structures may include any type of data structure, such as a linked list, a tree, a hash table, a database, or any other type of data structure. The data structures may include information generated by a device and/or component. Additionally, or alternatively, the data structures may include information provided from any other source, such as information provided by one or more users, and/or information automatically provided by one or more other devices.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive a command from a source device;
   receive information that identifies a destination device associated with the command;
   receive information that identifies a user associated with the source device;
   determine a network condition of a network associated with the destination device;
   determine that the user is associated with an available token of a set of tokens,
   the available token being associated with the user, the command, and the network condition;
   determine that a particular time interval, associated with a command type, has lapsed,
   the command type being associated with the command; and
   transmit the command to the destination device based on:
   determining that the user is associated with the available token, and
   determining that the particular time interval has lapsed.

2. The device of claim 1, where, when determining that the user is associated with the available token, the one or more processors are further to:
   determine that the user is associated with the available token during a particular time period.

3. The device of claim 2, where the one or more processors are further to:
   determine that the user has not used more than a threshold quantity of the set of tokens during the particular time period; and
   where, when transmitting the command, the one or more processors are further to:
   transmit the command further based on determining that the user has not used more than the threshold quantity of the set of tokens.

4. The device of claim 1, where the one or more processors are further to:
   receive information associated with the command type.

5. The device of claim 1, where, when determining that the user is associated with the available token, the one or more processors are further to:
   determine that the user is not associated with a first available token,
   the first available token being associated with the network condition; and determine that the user is associated with a second available token,
   the second available token not being associated with the network condition.

6. The device of claim 1, where the network condition includes at least one of:
   a time period associated with a network traffic load,
   a network type associated with the destination device, or
   a device parameter associated with the destination device.

7. A method, comprising:
   receiving, by a device, a command from a source device;
   receiving, by the device, information that identifies a destination device associated with the command;
   receiving, by the device, information that identifies a user associated with the source device;
   determining, by the device, a network condition associated with a network to which the destination device is connected;
   determining, by the device, that the user is associated with an available token of one or more tokens,
   the available token being associated with the user, the command, and the network condition;
   determining, by the device, that a particular time interval, associated with a command type, has lapsed,
   the command type being associated with the command; and transmitting, by the device, the command to the destination device based on:
   determining that the user is associated with the available token, and
   determining that the particular time interval has lapsed.

8. The method of claim 7, where determining that the user is associated with the available token further comprises:
   determining that the user is associated with the available token during a particular time period.

9. The method of claim 8, further comprising:
   determining that the user has not used more than a threshold quantity of the one or more tokens during the particular time period; and where transmitting the command comprises:
    transmitting the command based on determining that the user has not used more than the threshold quantity of the one or more tokens.
10. The method of claim 7, further comprising:
    determining the command type.
11. The method of claim 7, where determining that the user is associated with the available token comprises:
    determining that the user is not associated with a first available token,
        the first available token being associated with the network condition; and determining that the user is associated with a second available token,
        the second available token not being associated with the network condition.
12. The method of claim 7, where the network condition includes at least one of:
    a time period associated with a network traffic load,
    a network type associated with the destination device, or
    a device parameter associated with the destination device.
13. The method of claim 7, further comprising:
    receiving, from the destination device, a notification that the destination device is ready to receive the command; and
    transmitting the command to the destination device further based on the notification.
14. A non-transitory computer-readable medium storing instructions, the instructions comprising:
    one or more instructions that, when executed by one or more processors, cause the one or more processors to:
        receive, from a source device, information that identifies a command, a destination device associated with the command, and a user associated with the source device;
        determine a current network condition associated with the destination device;
        determine that the user is associated with an available token, of a set of tokens,
            the available token being associated with the user, the command, and the current network condition;
        determine that a particular time interval, associated with a command type, has lapsed,
            the command type being associated with the command; and transmit the command to the destination device based on:
                determining that the user is associated with the available token, and
                determining that the particular time interval has lapsed.

15. The non-transitory computer-readable medium of claim 14, where the one or more instructions that, when executed by the one or more processors, cause the one or more processors to determine that the user is associated with the available token, further cause the one or more processors to:
    determine that the user is associated with the available token during a particular time period.
16. The non-transitory computer-readable medium of claim 15, the instructions further comprising:
    one or more instructions that, when executed by the one or more processors, cause the one or more processors to:
        determine that the user has not used more than a threshold quantity of the set of tokens during the particular time period; and
    where the one or more instructions that, when executed by the one or more processors, cause the one or more processors to transmit the command, further cause the one or more processors to:
        transmit the command based on determining that the user has not used more than the threshold quantity of the set of tokens.
17. The non-transitory computer-readable medium of claim 14, the instructions further comprising:
    one or more instructions that, when executed by the one or more processors, cause the one or more processors to:
        determine the command type associated with the command.
18. The non-transitory computer-readable medium of claim 14, the instructions further comprising:
    one or more instructions that, when executed by the one or more processors, cause the one or more processors to:
        determine that the user is not associated with a first available token,
            the first available token being associated with the current network condition; and
        determine that the user is associated with a second available token,
            the second available token not being associated with the current network condition.
19. The non-transitory computer-readable medium of claim 14, where the current network condition includes at least one of:
    a time period associated with a network traffic load,
    a network type associated with the destination device, or
    a device parameter associated with the destination device.
20. The non-transitory computer-readable medium of claim 14, where the available token is purchased by the user via the source device.

* * * * *